S. E. & M. P. JACKSON.
Harvesting Machine.
No. 18,975.
2 Sheets—Sheet 1.
Patented Dec. 29, 1857.
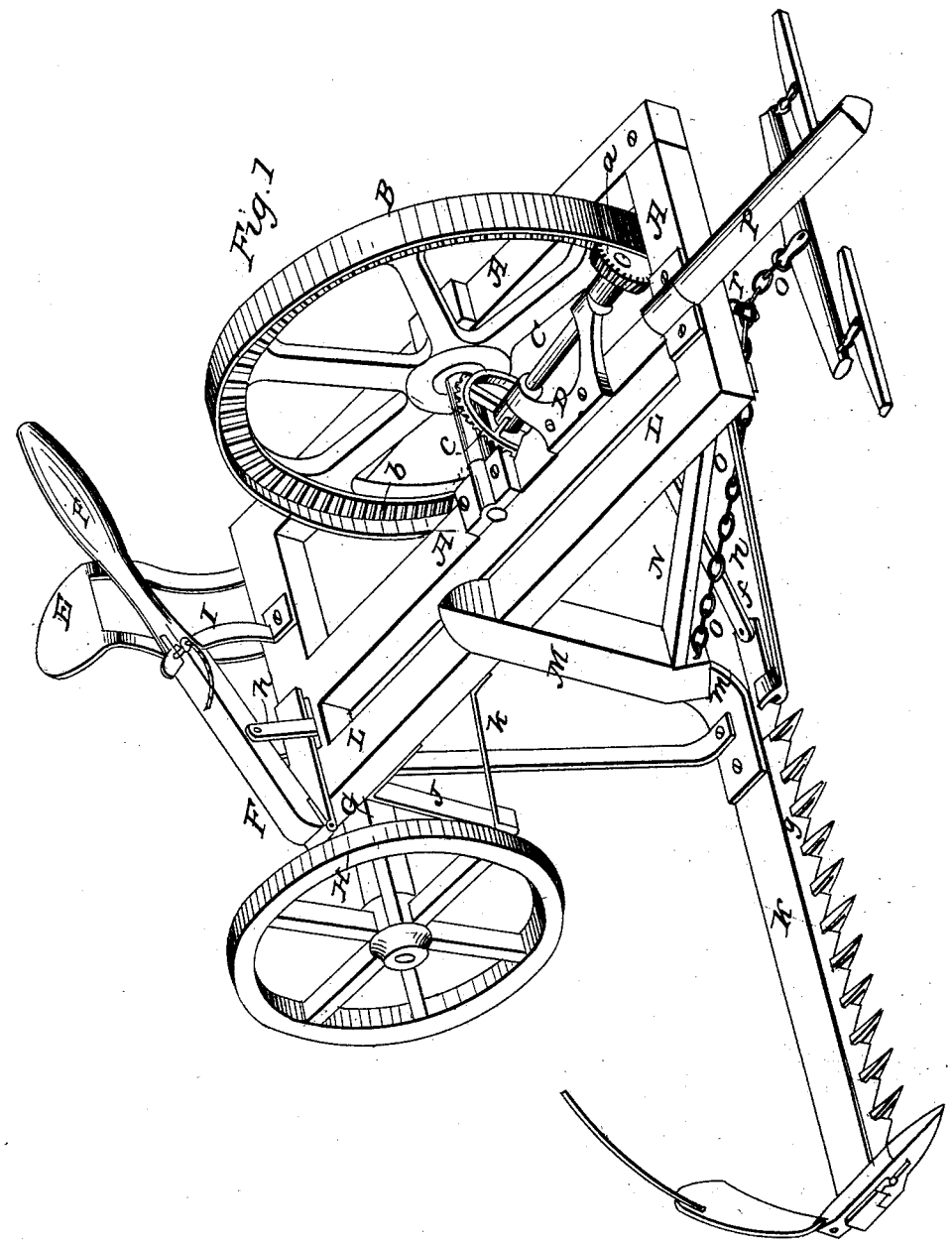

S. E. & M. P. JACKSON.
Harvesting Machine.
No. 18,975.
2 Sheets—Sheet 2.
Patented Dec. 29, 1857.
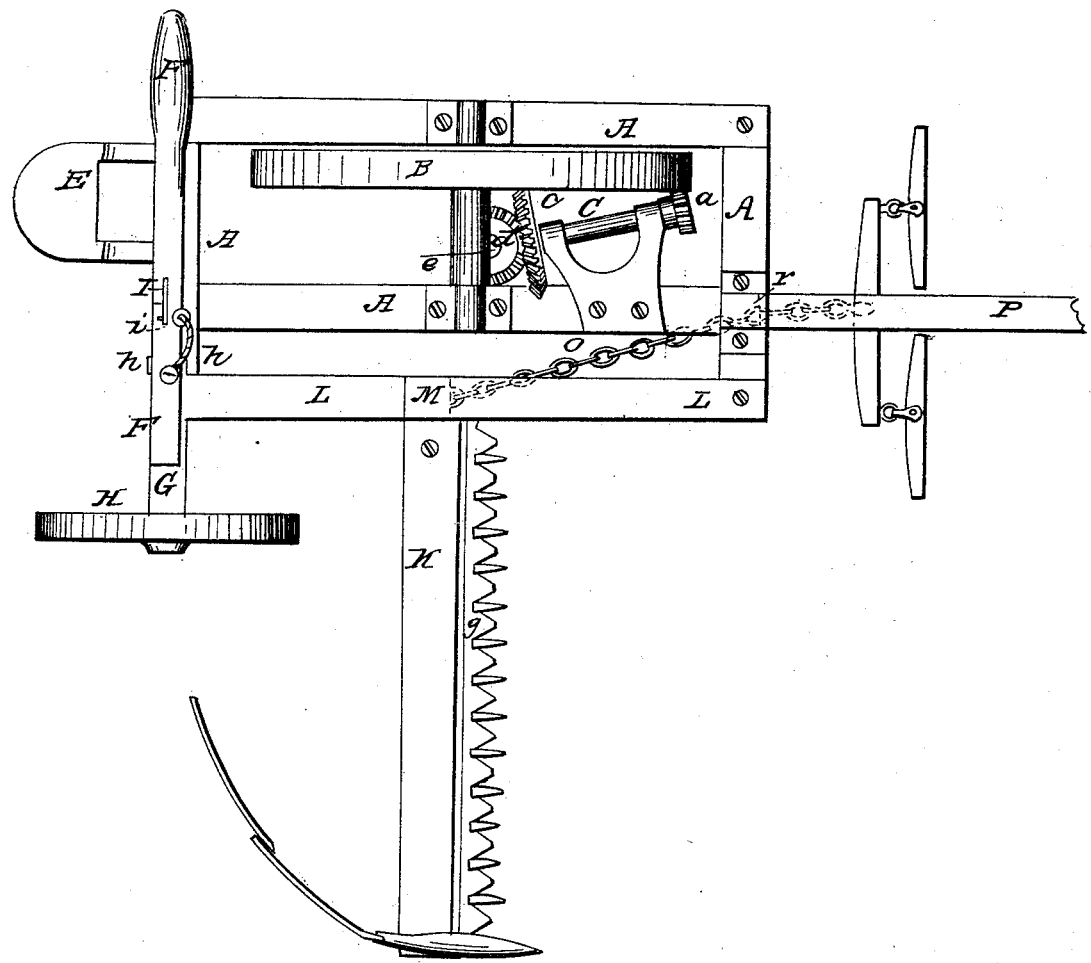

UNITED STATES PATENT OFFICE.

SILAS E. JACKSON AND MORGAN P. JACKSON, OF BOONVILLE, NEW YORK.

IMPROVEMENT IN MOWING-MACHINES.

Specification forming part of Letters Patent No. 18,975, dated December 29, 1857.

*To all whom it may concern:*

Be it known that we, SILAS E. JACKSON and MORGAN P. JACKSON, of Boonville, in the county of Oneida and State of New York, have invented certain new and useful Improvements in Harvesting-Machines; and we do hereby declare the following to be a full, clear, and exact description of the construction and operation of the same, reference being had to the accompanying drawings, making a part of this specification, in which—

Figure 1 represents the machine in perspective, and Fig. 2 represents a top plan.

Similar letters of reference, where they occur in the separate figures, denote like parts of the machine in both of them.

Many attempts have been made in harvesting-machines to counteract side draft, and though what has heretofore been done may have in a measure obviated that evil, yet there remains much of it from the very nature of the machine, as the work is done beyond the frame and to one side of it. Tongues with one of their forks extending toward the cutter-bar, iron rods connecting the cutter-bar with the line of draft, braces, and even chains have been used to this end. The error, as we believe, lies in this, that in all the attempts heretofore made the devices which were designed to remedy the evil have been either rigidly connected to the tongue, frame, or cutter-bar, or their action impeded by restricting their free and untrammeled movement, either of which causes will prevent them from accomplishing the object for which they are designed. It is obvious that a rigid connection from one part of the machine to the other tends only to make the parts as one; and so long as the line of draft in a machine thus connected is parallel with the tongue side draft cannot be effected by it, as the machine follows the line of draft, as a whole, and not in individual parts. So, also, if a flexible connection be made between that part of the machine next the cutter-bar and the tongue, and the tongue has no lateral motion, how can that flexible connection effect side draft when the draft is in the line of the tongue, which is practically rigid on the frame, so far as side draft is concerned? In order that one part of the machine may have a motion independent of the other part or parts, it must have no rigid connections with it, or else the line of draft and the tongue must be independent of each other.

The nature of our invention consists in counteracting side draft by a flexible connection which extends from that part of the machine next the cutter-bar to a point underneath or in line with the tongue, but not connected to the tongue, or in any wise controlled by it; or, in other words, we make draft one thing and guidance another, neither affecting the other. Thus the draft may be oblique and the guidance in a right line; and, as a very important feature, in connection with our invention, we do not have to build the machine expressly for its application, but can, at a very slight expense, apply it to machines already constructed.

To enable others skilled in the art to make and use our invention, we will proceed to describe the same with reference to the drawings, confining it mainly to those parts of the machine most immediately connected with the parts claimed as new.

A represents an ordinary frame suspended to the axle of the main driving and supporting wheel B. A shaft, C, is supported on the frame by a plate, D, one end of said shaft having a beveled pinion, *a*, upon it, which meshes with and receives motion from the gear *b* on the main wheel B. The other end of said shaft C has a beveled pinion, *c*, on it, which gears with and gives motion to another similar pinion, *d*, on a vertical shaft, *e*, which is also supported in proper bearings on the frame A. On the lower end of the shaft *e* there is a crank, to which one end of the connecting-rod *f* is attached, the other end being attached to the cutters *g*, and thus they receive their motion.

On the rear transverse piece of the frame A, at that corner most remote from the standing grass or grain, is fixed the driver's seat E, and at the other end of said piece is hinged a lever, F, which extends from thence to the driver's seat. Underneath the said rear cross-piece of the frame, and about under the driver's seat, an axle, G, is also hinged, which is parallel with the cross-piece below it, as the lever F is above said cross-piece; or, in other words, the lever and axle are hinged at opposite corners of the frame—the former above and the latter below—and extend from their hinged points in opposite directions from each other. The axle G has upon it a supporting-wheel, H, and said axle and lever F are connected together by straps $h$, so as to be worked together. I is a curved bar passing through a mortise in the lever F, so that a pin, $i$, may hold the lever at any adjusted position when desired. J is a guide-piece suspended from the frame and braced to it by a bar, $k$. Its object is to keep the axle G in proper line.

K is the finger-bar, secured rigidly to the main frame by the braces $l\ m\ n$.

L is an auxiliary rail connected to the main frame, and if added when the machine is building may be of wood, and framed into the end pieces, like the other longitudinal pieces of the frame; but when the frame is already constructed we make the rail L out of a bent bar, united to the ordinary frame at its ends, and bowing out sufficient for the purpose for which it is intended, as will be explained. From the rail or bar L there projects downward at about the line of the finger-bar, though it may be forward of or behind that line, (particularly the latter,) a stud, M, which is braced from its lower end to the front of the frame by a brace, N. The stud M may be rigidly connected to the rail or bar L, but not necessarily so, as it may be slightly loose thereon, the draft, when on, bringing it against the brace and the brace against the frame, and this looseness may prevent any injury to the parts against sudden shocks in starting or in striking any obstacle.

At the lower end of the stud M there is fastened a chain, O, which extends upward and passes through a ring, $r$, on the under side of the front cross-piece of the frame and about underneath the heel of the tongue P, which is rigid or otherwise, in the usual way; and to the end of this chain is attached the double-trees or whiffletrees to which the horse or horses are hitched. The ring $r$ is not to confine the chain to any specific point in a lateral direction, but to prevent it from falling upon the ground. The draft is on this chain, and is therefore against the side draft of the machine, while the horses may walk on either side of the tongue in the usual way, having the end of the tongue fastened to their collars by breast straps or chains; and thus the machine is drawn by the chain from one point, and that oblique to the line of motion of the machine, while the tongue guides the machine, mainly, however, in turning around, for we have so effectually counteracted side draft that the machine almost, if not quite, guides itself in a straight line. The tongue, to be sure, defines the position of the horse or horses, but they draw upon the chain which is oblique to that line; and the chain would be at some point underneath the line of the tongue if the ring $r$ were removed entirely. The drawing and guiding are therefore separate things, although the position of the tongue (for it defines the position of the horses) does to a certain extent fix the position of the end of the chain to which the horses are hitched. The efficiency of the chain, as herein described, for counteracting side draft is exemplified in the act of turning the machine around from right to left, which is the customary way. When the driver, by the lever F, raises up the rear right-hand corner of the frame, stud M, which is nearest that corner, is also raised up, and the front and diagonally-opposite corner of the frame is correspondingly lowered, so that the chain approaches more nearly a horizontal position. The horses now, drawing upon the chain, pull it around with scarcely any aid from the tongue, as the line of draft is directly in the circuit in which the machine is turning, and is uninfluenced by the frame or tongue. If the chain were fastened to the tongue, this would not be the case, because the machine could not be brought around any faster than the tongue moved around, proving that by such a connection the machine must follow the tongue and not the line of draft.

Having thus fully described the nature and object of our invention, what we claim therein as new, and desire to secure by Letters Patent, is—

Counteracting the side draft of a harvesting-machine by attaching the power that draws it to the uncontrolled end of a chain, the other end of said chain being attached to the lower end of a stud or bar, located and arranged, with regard to the frame, substantially as herein described.

SILAS E. JACKSON.
MORGAN P. JACKSON.

Witnesses:
A. B. STOUGHTON,
THOS. H. UPPERMAN.